United States Patent
Vanhalle et al.

(10) Patent No.: US 9,136,041 B2
(45) Date of Patent: Sep. 15, 2015

(54) FLAME RETARDANT COMPOSITION FOR THERMOPLASTIC POLYURETHANE POLYMERS

(75) Inventors: Anja Anneke Vanhalle, Everberg (BE); Hugo Verbeke, Wilsele (BE); Giacomo Giannini, The Woodlands, TX (US); Sandra Meynen, Tienen (BE)

(73) Assignee: Huntsman International LLC, The Woodlands, TX (US)

( * ) Notice: Subject to any disclaimer, the term of this patent is extended or adjusted under 35 U.S.C. 154(b) by 64 days.

(21) Appl. No.: 14/002,207

(22) PCT Filed: Feb. 9, 2012

(86) PCT No.: PCT/EP2012/052224
§ 371 (c)(1),
(2), (4) Date: Aug. 29, 2013

(87) PCT Pub. No.: WO2012/116886
PCT Pub. Date: Sep. 7, 2012

(65) Prior Publication Data
US 2013/0338279 A1    Dec. 19, 2013

(30) Foreign Application Priority Data

Mar. 2, 2011  (EP) ..................................... 11156520
Mar. 14, 2011 (EP) ..................................... 11158081

(51) Int. Cl.
*H01B 7/295*    (2006.01)
*C08K 5/52*     (2006.01)
*C09K 21/12*    (2006.01)
*C08K 3/22*     (2006.01)

(52) U.S. Cl.
CPC  *H01B 7/295* (2013.01); *C08K 3/22* (2013.01); *C08K 5/52* (2013.01); *C09K 21/12* (2013.01)

(58) Field of Classification Search
CPC .................................. C08K 5/52; H01B 7/295
USPC ........................................................... 524/127
See application file for complete search history.

(56) References Cited

U.S. PATENT DOCUMENTS

| | | |
|---|---|---|
| 4,131,731 A | 12/1978 | Lai et al. |
| 4,347,334 A | 8/1982 | Staendeke et al. |
| 4,467,056 A | 8/1984 | Staendeke et al. |
| 4,514,328 A | 4/1985 | Staendeke et al. |
| 4,639,331 A | 1/1987 | Elsner et al. |
| 6,015,510 A | 1/2000 | Jacobson et al. |
| 7,417,083 B2 * | 8/2008 | Kosaka et al. ................ 524/100 |
| 2005/0256234 A1 | 11/2005 | Kurumatani et al. |
| 2005/0285086 A1 | 12/2005 | Kosaka et al. |
| 2007/0261878 A1 | 11/2007 | Kosaka et al. |
| 2008/0206468 A1 | 8/2008 | Klei et al. |
| 2011/0130490 A1 | 6/2011 | Brown et al. |
| 2012/0073858 A1 | 3/2012 | Vanhalle et al. |

FOREIGN PATENT DOCUMENTS

| | | |
|---|---|---|
| EP | 1516907 A | 3/2005 |
| JP | 05209086 A | 8/1992 |
| WO | 2010/012136 A | 2/2010 |
| WO | 2010142519 A | 12/2010 |
| WO | WO 2010 147761 | * 12/2010 |

* cited by examiner

*Primary Examiner* — Doris Lee
(74) *Attorney, Agent, or Firm* — Robert A. Diaz

(57) ABSTRACT

The present invention relates to a formulation comprising at least one thermoplastic polyurethane polymer and a flame retardant composition, the flame retardant composition comprising
  i) at least one metal or metalloid oxide particle selected from magnesium oxide, magnesium hydroxide, silicon oxide, or aluminium oxide;
  ii) at least one phosphate component selected from the group comprising ammonium polyphosphate (APP), melamine phosphate, melamine pyrophosphate and melamine polyphosphate or mixture thereof, and
  iii) at least one oligomeric phosphate ester.

20 Claims, No Drawings

US 9,136,041 B2

FLAME RETARDANT COMPOSITION FOR THERMOPLASTIC POLYURETHANE POLYMERS

CROSS-REFERENCE TO RELATED APPLICATIONS

This application is the National Phase Of International Application PCT/EP2012/52224 filed Feb. 9, 2012 which designated the U.S. and which claims priority to European App. Serial No. 11156520.6 filed Mar. 2, 2011 and European App. Serial No. 1115808.7 filed Mar. 14, 2011. The noted applications are incorporated herein by reference.

FIELD OF THE INVENTION

The present invention relates to flame retardant composition and the use thereof in thermoplastic polyurethane formulation.

BACKGROUND TO THE INVENTION

Thermoplastically processable polyurethane—which will be referred to as TPU below—is a material that has proven successful as a sheath material in the cable industry due to its excellent properties. The material is highly abrasion resistant, has high thermal stability, and can be made flame-resistant to self-extinguishing by adding certain materials. Cable sheaths made of polyurethane exhibit resistance to cutting, initial tearing, and tear propagation. In addition, polyurethane is or can be formulated to be resistant to ozone, microbes, oil, and high-energy radiation. Cables equipped with a polyurethane sheath are extremely flexible and can withstand high numbers of bending cycles over tight radii.

However TPU has a mostly undesirable characteristic in that it forms a relatively thin melt at elevated temperatures. In case of fire, this has the effect that the liquid material drips off and the cable core is thus exposed. At extremely high temperatures, the materials added to improve flame-resistance are frequently inadequate, and burning or hot material drips and, under some circumstances, ignites other material, thereby causing a rapid expansion of fire.

It is an object of the present invention to provide a formulation comprising at least one TPU, which formulation has less tendency to drip or even does not drip in case of fire and has excellent flame retardancy.

SUMMARY OF THE INVENTION

The present inventors have now found these objects can be obtained by using a formulation according to the present invention. According to a first aspect of the present invention, a formulation comprises at least one thermoplastic polyurethane polymer and a flame retardant composition comprising:
i) at least one metal or metalloid oxide particle selected from magnesium oxide, magnesium hydroxide, silicon oxide, or aluminium oxide;
ii) at least one phosphate component selected from the group comprising ammonium polyphosphate (APP), melamine phosphate, melamine pyrophosphate and melamine polyphosphate or mixture thereof, and
iii) at least one oligomeric phosphate ester.

The flame retardant composition is particularly useful for applications where high flame retardant performance is desirable, such as wire and cable applications, blown film, molding applications, and the like. The flame retardant composition has been found especially useful in reduction of dripping and flag burning during a UL VW-1 Vertical-Wire Flame Test (UL 1581) when used in combination with thermoplastic polyurethane polymer or polymers.

Hence the present invention encompasses, as a second aspect of the present invention, the use of a flame retardant composition in a thermoplastic polyurethane polymer formulation, which flame retardant composition comprises
i) at least one metal or metalloid oxide particle selected from magnesium oxide, magnesium hydroxide, silicon oxide, or aluminium oxide;
ii) at least one phosphate component selected from the group comprising ammonium polyphosphate (APP), melamine phosphate, melamine pyrophosphate and melamine polyphosphate or mixture thereof, and
iii) at least one oligomeric phosphate ester.

The present invention also encompasses, as a third aspect of the present invention, the use of the formulation according to the first aspect of the present invention, as thermal and/or electrical insulator for electrical conductors or as jacketing for electrical conductors in wire and/or cable construction applications.

According to a fourth aspect, the present invention relates to the use of a formulation according to the first aspect of the present invention in a wire and/or cable construction comprising at least one metal conductor.

According to an embodiment of the present invention, the formulation according to the first aspect of the present invention is used as thermal and/or electric insulator for separately insulating one or more of the electrical conductors in wire and/or cable construction applications, said wire and/or cable construction application comprising one or more electrical conductors.

According to an embodiment of the present invention, the formulation according to the first aspect of the present invention is used as jacket for simultaneously insulating one or more of the electrical conductors in wire and/or cable construction applications, each of said one or more conductors beings separately provided with a thermal and/or electric insulator.

According to an embodiment of the present invention, the formulation according to the first aspect of the present invention is used as jacket for simultaneously insulating one or more of the electrical conductors in wire and/or cable construction applications, each of said one or more conductors beings separately provided with a thermal and/or electric insulator, wherein a formulation according to the first aspect of the present invention is used as thermal and/or electric insulator for separately insulating one or more of the electrical conductors in wire and/or cable construction applications.

The formulation to provide the jacket may be identical or different from the formulation used to thermal and/or electric insulator for separately insulating one or more of the electrical conductors in the wire and/or cable construction application.

The independent and dependent claims set out particular and preferred features of the invention. Features from the dependent claims may be combined with features of the independent or other dependent claims as appropriate.

The above and other characteristics, features and advantages of the present invention will become apparent from the following detailed description, which illustrate, by way of example, the principles of the invention.

DETAILED DESCRIPTION OF THE INVENTION

Before the present compositions and formulations of the invention are described, it is to be understood that this invention is not limited to particular compositions and formulations described, since such compositions and formulation may, of course, vary. It is also to be understood that the terminology used herein is not intended to be limiting, since the scope of the present invention will be limited only by the appended claims.

As used herein, the singular forms "a", "an", and "the" include both singular and plural referents unless the context clearly dictates otherwise.

The terms "comprising", "comprises" and "comprised of" as used herein are synonymous with "including", "includes" or "containing", "contains", and are inclusive or open-ended and do not exclude additional, non-recited members, elements or method steps. It will be appreciated that the terms "comprising", "comprises" and "comprised of" as used herein comprise the terms "consisting of", "consists" and "consists of".

The recitation of numerical ranges by endpoints includes all numbers and fractions subsumed within the respective ranges, as well as the recited endpoints.

All references cited in the present specification are hereby incorporated by reference in their entirety. In particular, the teachings of all references herein specifically referred to are incorporated by reference.

Unless otherwise defined, all terms used in disclosing the invention, including technical and scientific terms, have the meaning as commonly understood by one of ordinary skill in the art to which this invention belongs. By means of further guidance, term definitions are included to better appreciate the teaching of the present invention.

In the following passages, different aspects of the invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the invention, and form different embodiments, as would be understood by those in the art. For example, in the appended claims, any of the claimed embodiments can be used in any combination.

The present invention relates to a formulation comprising at least one, but optionally more than one thermoplastic polyurethane polymer, and a flame retardant composition, said flame retardant composition comprising:
i) at least one metal or metalloid oxide particle selected from magnesium oxide, magnesium hydroxide, silicon oxide, or aluminium oxide, preferably magnesium oxide particle,
ii) a phosphate component selected from the group comprising ammonium polyphosphate (APP), melamine phosphate, melamine pyrophosphate and melamine polyphosphate, or mixture thereof, preferably ammonium polyphosphate, and
iii) an oligomeric phosphate ester, preferably a liquid oligomeric phosphate ester.

The ingredients of the flame retardant composition can be mixed to the thermoplastic polyurethane polymer or polymers.

Preferably, particles of magnesium oxide, silicon oxide, or aluminium oxide may be used. More preferably the magnesium oxide, silicon oxide, or aluminium oxide may be micro-, or nano-particles.

As used throughout this application, "micro-particles" "micron-particles" "micron-sized particles" "micro-sized particles" are particles having an average diameter of less than 300 µm, for example of between 0.1 µm and 300 µm, preferably between 0.1 and 200 µm, more preferably between 0.1 and 150 µm, for example from 0.1 to 100 µm, for example from 0.1 to 50 µm, more preferably 0.1 µm and 20 µm. As also used throughout this application, "nano-particles" or "nano-sized particles" are particles having an average diameter of between 1 nanometer and 100 nanometers.

Preferably, the at least one metal or metalloid oxide particle has an average particle size (D99) of less than 300 µm preferably of less than 200 µm, more preferably of less than 150 µm.

As used herein, particle average size may be expressed as "Dxx" where the "xx" is the volume percent of that particle having a size equal to or less than the Dxx. The D99 is defined as the particle size for which ninety nine percent by volume of the particles has a size lower than the D99. The D99 can be measured by laser diffraction analysis, for example on a Malvern type analyzer. Particle size can be measured using laser diffraction with a Malvern Mastersizer.

The amount of the metal or metalloid oxide in the flame retardant composition can range from 0.5 to 11% by weight based on 100% by weight of the flame retardant composition, e.g., from 1% to 10% by weight. Preferably, the amount of metal or metalloid oxide in the flame retardant composition is ranging between 1% to 8% by weight. Preferably, the amount of the magnesium oxide, silicon oxide, or aluminium oxide in the flame retardant composition can range from 0.5 to 11% by weight based on 100% by weight of the flame retardant composition, e.g., from 1% to 10% by weight. Preferably, the amount of magnesium oxide, silicon oxide, or aluminium oxide in the flame retardant composition is ranging between 1% to 8% by weight. Preferably magnesium oxide is used, using amounts in the above mentioned ranges.

According to the invention, the flame retardant composition comprises a phosphate component selected from the group comprising ammonium polyphosphate, melamine phosphate, melamine pyrophosphate and melamine polyphosphate, or mixture thereof.

Ammonium polyphosphate is known and described as, for example, a flame retardant. Ammonium polyphosphate is an inorganic salt of polyphosphoric acid and ammonia. The chemical formula of ammonium polyphosphate is $[NH_4PO_3]_n$ and corresponds to the general formula (I):

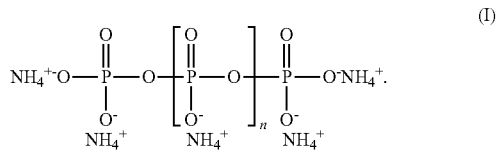

The chain length (n) of this polymeric compound is both variable and can be branched, and can be greater than 100, preferably greater than 1000. Preferably the ammonium polyphosphate has the general formula (II):

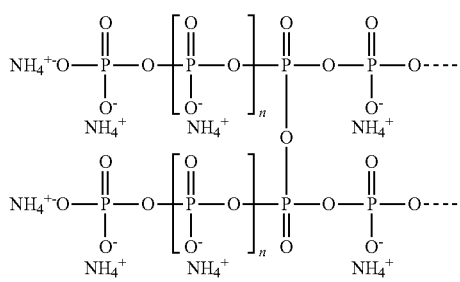

with n greater than 100, preferably greater than 1000.

The phosphate component can be melamine compound selected from melamine phosphate, melamine pyrophosphate or melamine polyphosphate, or a mixture thereof. The melamine compound has general formula (III):

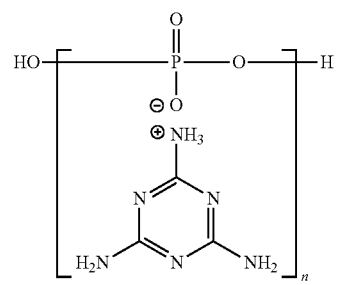

wherein n=1 is melamine-phosphate, n=2 is melamine-pyrophosphate; n>2 is melamine-polyphosphate.

The phosphate component may or may not be encapsulated. Preferably the phosphate component is encapsulated.

Suitable encapsulated ammonium polyphosphate are described in U.S. Pat. Nos. 4,347,334, 4,467,056, 4,514,328, and 4,639,331 hereby incorporated by reference. Such encapsulated ammonium polyphosphates contain a hardened, water insoluble resin enveloping the individual ammonium polyphosphate particles. The resin may be a phenol-formaldehyde resin, an epoxy resin, a surface reacted silane, a surface reacted melamine or a melamine-formaldehyde resin. As an example for use is the encapsulated ammonium polyphosphate flame retardant available under the trademarks FR CROS C 60, FR CROS C30, FR CROS C70 from Chemische Fabrik Budenheim, Budenheim am Rhein, Germany. For example, the encapsulated ammonium polyphosphate flame retardant can be a melamine-formaldehyde encapsulated ammonium polyphosphate additive.

Suitable encapsulated melamine compounds are described in U.S. Pat. No. 6,015,510 hereby incorporated by reference. Such melamine compounds contain an outer coating. Such coating compounds may comprise organo silanes such as alkyl silanes, amino silanes, mixtures of alkyl silanes and polysiloxanes; esters; polyols; dicarboxylic acids; aromatic or aliphatic dianhydrides; melamine formaldehyde; and mixtures thereof.

The phosphate component can be present in the flame retardant composition in an amount ranging from 25% to 85% by weight based on 100% by weight of the flame retardant composition, preferably from 35% to 81% by weight. Preferably ammonium polyphosphate can be present in the flame retardant composition in an amount ranging from 25% to 85% by weight based on 100% by weight of the flame retardant composition, preferably from 35% to 81% by weight.

The composition comprises at least one oligomeric phosphate ester, i.e. an oligomeric molecule with no more than 10 phosphate ester monomer units, hence an oligomeric molecule with 2 to 10 phosphate ester monomer units. Preferably, the oligomeric phosphate ester is liquid, i.e. liquid at 25 deg C. More preferably, the liquid oligomeric phosphate ester is resorcinol bis(diphenyl phosphate) and has the following general formula

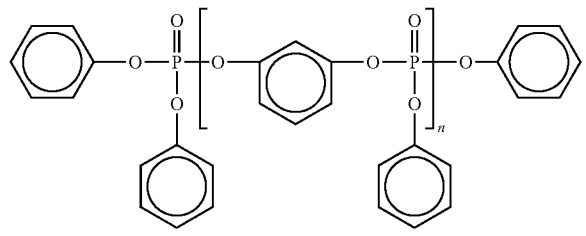

n = 1-7

The oligomeric phosphate ester can be present in the composition in an amount ranging from 10% to 70% by weight based on 100% by weight of the flame retardant composition, preferably from 13% to 60% by weight. Preferably resorcinol bis(diphenyl phosphate) can be present in the composition in an amount ranging from 10% to 70% by weight based on 100% by weight of the flame retardant composition, preferably from 13% to 60% by weight.

In an embodiment, the flame retardant composition may comprise from 43% to 49% by weight of ammonium polyphosphate, from 46% to 54% by weight of resorcinol bis(diphenyl phosphate) and from 1% to 8% by weight of magnesium oxide based on 100% by weight of the flame retardant composition.

In some embodiments, the composition may comprise from 62% to 81% by weight of ammonium polyphosphate, from 13% to 34% by weight of resorcinol bis(diphenyl phosphate) and from 4% to 6% by weight of magnesium oxide based on 100% by weight of the flame retardant composition.

The present composition is useful when incorporated into a formulation further comprising thermoplastic polyurethane polymers, to impart fire retardant properties to the formulation. The thermoplastic polyurethane polymers can be made by reacting polyisocyanates with one of more polyols.

The formulation—also referred as "thermoplastic formulation"—comprising the flame retardant composition and the thermoplastic polyurethane polymer and has the advantage of forming a stable char layer when subjected to a flame. The thermoplastic polyurethane polymer obtains a reduced drip tendency accompanied by an improved flame retardancy. Moreover, the flame retardant composition has no or little effect upon the thermoplastic nature of the polyurethane polymer.

The at least one thermoplastic polyurethane polymer, or the combination of the thermoplastic polyurethane polymers, can be present in the formulation in an amount ranging from 35% to 75% by weight based on 100% by weight of the polymer formulation, preferably from 39% to 70% by weight, more preferably from 45% to 70% by weight.

The flame retardant composition according to the invention may be present in the formulation in an amount ranging from 25% to 65% by weight based on 100% by weight of the formulation, preferably in an amount ranging from 30% to 60%, more preferably in an amount ranging from 30% to 55%.

In some embodiments, the thermoplastic formulation may comprise:
i) 25% to 40% by weight of the flame retardant composition, preferably 30% to 35% by weight, based on 100% by weight of the formulation, and
ii) 60% to 75% thermoplastic polyurethane polymer by weight, preferably 65% to 70% by weight, based on 100% by weight of the formulation,
wherein said flame retardant composition may comprise from 46% to 49% by weight of ammonium polyphosphate, from 46% to 54% by weight of resorcinol bis(diphenyl phosphate) and from 1% to 8% by weight of magnesium oxide based on 100% by weight of the flame retardant composition.

In some embodiments, the thermoplastic formulation may comprise:
i) 45% to 65% by weight of the flame retardant composition, preferably 47% to 53% by weight, based on 100% by weight of the formulation, and
ii) 35% to 55% thermoplastic polyurethane polymer by weight, preferably 47% to 53% by weight, based on 100% by weight of the formulation,
wherein the flame retardant composition may comprise from 62% to 81% by weight of ammonium polyphosphate, from 13% to 34% by weight of resorcinol bis(diphenyl phosphate) and from 4% to 6% by weight of magnesium oxide based on 100% by weight of the flame retardant composition.

In the case of fire, the thermoplastic formulation according to the invention has the advantage of forming a crusty layer, which prevents molten, burning material from dripping. This crust has heat-insulating properties, which prevent accelerated heating of the material under the action of the flames.

The thermoplastic polymer is a thermoplastic polyurethane (TPU). The TPU polymer is generally prepared by reacting a polyisocyanate with an intermediate such as a hydroxyl terminated polyester (polyester polyols), a hydroxyl terminated polyether (polyether polyols), a hydroxyl terminated polycarbonate or mixture thereof, with one or more chain extenders, all of which are well known to those skilled in the art.

The hydroxyl terminated polyester intermediate (polyester polyols) can be generally a linear polyester having a number average molecular weight (Mn) of from about 500 to about 10000, desirably from about 700 to about 5000, and preferably from about 700 to about 4000, an acid number generally less than 1.3 and preferably less than 0.8. The molecular weight is determined by assay of the terminal functional groups and is related to the number average molecular weight. The polymers are produced by (1) an esterification reaction of one or more glycols with one or more dicarboxylic acids or anhydrides or (2) by transesterification reaction, i.e. the reaction of one or more glycols with esters of dicarboxylic acids. Mole ratios generally in excess of more than one mole of glycol to acid are preferred so as to obtain linear chains having a preponderance of terminal hydroxyl groups. Suitable polyester intermediates also include various lactones such as polycaprolactone typically made from caprolactone and a bifunctional initiator such as diethylene glycol. The dicarboxylic acids of the desired polyester can be aliphatic, cycloaliphatic, aromatic, or combinations thereof. Suitable dicarboxylic acids which can be used alone or in mixtures generally have a total of from 4 to 15 carbon atoms and include: succinic, glutaric, adipic, pimelic, suberic, azelaic, sebacic, dodecanedioic, isophthalic, terephthalic, cyclohexane dicarboxylic, and the like. Anhydrides of the above dicarboxylic acids such as phthalic anhydride, tetrahydrophthalic anhydride, or the like, can also be used. Adipic acid is the preferred acid. The glycols which are reacted to form a desirable polyester intermediate can be aliphatic, aromatic, or combinations thereof, and have a total of from 2 to 12 carbon atoms, and include ethylene glycol, 1,2-propanediol, 1,3-propanediol, 1,3-butanediol, 1,4-butanediol, 1,5-pentanediol, 1,6-hexanediol, 2,2-dimethyl-1,3-propanediol, 1,4-cyclohexanedimethanol, decamethylene glycol, dodecamethylene glycol, and the like. 1,4-Butanediol is the preferred glycol.

Hydroxyl terminated polyether intermediates are polyether polyols derived from a diol or polyol having a total of from 2 to 15 carbon atoms, preferably an alkyl diol or glycol which is reacted with an ether comprising an alkylene oxide having from 2 to 6 carbon atoms, typically ethylene oxide or propylene oxide or mixtures thereof. For example, hydroxyl functional polyether can be produced by first reacting propylene glycol with propylene oxide followed by subsequent reaction with ethylene oxide. Primary hydroxyl groups resulting from ethylene oxide are more reactive than secondary hydroxyl groups and thus are preferred. Useful commercial polyether polyols include poly(ethylene glycol) comprising ethylene oxide reacted with ethylene glycol, poly (propylene glycol) comprising propylene oxide reacted with propylene glycol, poly(tetramethyl glycol) (PTMG) comprising water reacted with tetrahydrofuran (THF). Polytetramethylene ether glycol (PTMEG) is the preferred polyether intermediate. Polyether polyols further include polyamide adducts of an alkylene oxide and can include, for example, ethylenediamine adduct comprising the reaction product of ethylenediamine and propylene oxide, diethylenetriamine adduct comprising the reaction product of diethylenetriamine with propylene oxide, and similar polyamide type polyether polyols. Copolyethers can also be utilized in the current invention. Typical copolyethers include the reaction product of THF and ethylene oxide or THF and propylene oxide. The various polyether intermediates generally have a number average molecular weight (Mn), as determined by assay of the terminal functional groups which is an average molecular weight, of from about 500 to about 10000, desirably from about 500 to about 5000, and preferably from about 700 to about 3000.

Hydroxyl terminated polycarbonate intermediates can be prepared by reacting a glycol with a carbonate. U.S. Pat. No. 4,131,731 is hereby incorporated by reference for its disclosure of hydroxyl terminated polycarbonates and their preparation. Such polycarbonates are linear and have terminal hydroxyl groups with essential exclusion of other terminal groups. The essential reactants are glycols and carbonates. Suitable glycols are selected from cycloaliphatic and aliphatic diols containing 4 to 40, and preferably 4 to 12 carbon atoms, and from polyoxyalkylene glycols containing 2 to 20 alkoxy groups per molecule with each alkoxy group containing 2 to 4 carbon atoms. Diols suitable for use in the present invention include aliphatic diols containing 4 to 12 carbon atoms such as butanediol-1,4, pentanediol-1,4, neopentyl glycol, hexanediol-1,6,2,2,4-trimethylhexanedion-1,6, decanediol-1,10, hydrogenated dilinoleylglycol, hydrogenated diolelylglycol; and cycloaliphatic diols such as cyclohexanediol-1,3, dimethylolcyclohexane-1,4, cyclohexanediol-1,4, dimethylolcyclohexane-1,3,1,4- endomethylene-2-hydroxy-5-hydroxymethyl cyclohexane, and polyalkylene glycols. The diols used in the reaction may be a single diol or a mixture of diols depending on the properties desired in the finished product.

Non-limiting examples of suitable carbonates for use herein include ethylene carbonate, trimethylene carbonate, tetramethylene carbonate, 1,2-propylene carbonate, 1,2-butylene carbonate, 2,3-butylene carbonate, 1,2-ethylene carbonate, 1,3-pentylene carbonate, 1,4-pentylene carbonate, 2,3-pentylene carbonate and 2,4-pentylene carbonate.

Also suitable herein are dialkylcarbonates, cycloaliphatic carbonates, and diarylcarbonates. The dialkylcarbonates can contain 2 to 5 carbon atoms in each alkyl group and specific examples thereof are diethylcarbonate and dipropylcarbonate. Cycloaliphatic carbonates, especially dicycloaliphatic carbonates, can contain 4 to 7 carbon atoms in each cyclic structure, and there can be one or two of such structures. When one group is cycloaliphatic, the other can be either alkyl or aryl. On the other hand, if one group is aryl, the other can be alkyl or cycloaliphatic. Preferred examples of diarylcarbonates, which can contain 6 to 20 carbon atoms in each aryl group, are diphenylcarbonate, ditolylcarbonate and dinaphthylcarbonate.

The reaction is carried out by reacting a glycol with a carbonate, preferably an alkylene carbonate in the molar range of 10:1 to 1:10, but preferably 3:1 to 1:3 at a temperature of 100° C. to 300° C. and at a pressure in the range of 0.1 to 300 mm Hg in the presence or absence of an ester interchange catalyst, while removing low boiling glycols by distillation.

More specifically, the hydroxyl terminated polycarbonates can be prepared in two stages. In the first stage, a glycol is reacted with an alkylene carbonate to form a low molecular weight hydroxyl terminated polycarbonate. The lower boiling point glycol is removed by distillation at 100° C. to 300° C., preferably at 150° C. to 250° C., under a reduced pressure of 10 to 30 mm Hg, preferably 50 to 200 mm Hg. A fractionating column is used to separate the by-product glycol from the reaction mixture. The by-product glycol is taken off the top of the column and the unreacted alkylene carbonate and glycol reactant are returned to the reaction vessel as reflux. A current of inert gas or an inert solvent can be used to facilitate removal of by-product glycol as it is formed. When amount of by-product glycol obtained indicates that degree of polymerization of the hydroxyl terminated polycarbonate is in the range of 2 to 10, the pressure is gradually reduced to 0.1 to 10 mm Hg and the unreacted glycol and alkylene carbonate are removed. This marks the beginning of the second stage of reaction during which the low molecular weight hydroxyl terminated polycarbonate is condensed by distilling off glycol as it is formed at 100° C. to 300° C., preferably 150° C. to 250° C. and at a pressure of 0.1 to 10 mm Hg until the desired molecular weight of the hydroxyl terminated polycarbonate is attained. Molecular weight (Mn) of the hydroxyl terminated polycarbonates can vary from about 500 to about 10000 but in a preferred embodiment, it will be in the range of 500 to 2500.

Non-limiting examples of suitable extender glycols (i.e., chain extenders) are lower aliphatic or short chain glycols having from about 2 to about 10 carbon atoms and include, for instance, ethylene glycol, diethylene glycol, propylene glycol, dipropylene glycol, 1,4-butanediol, 1,6-hexanediol, 1,3-butanediol, 1,5-pentanediol, 1,4-cyclohexanedimethanol, hydroquinone di(hydroxyethyl)ether, neopentylglycol, and the like, with 1,4-butanediol and hydroquinone di(hydroxyethyl)ether being preferred.

The desired TPU polymer used in the TPU formulation of this invention is generally made from the abovementioned intermediates such as a hydroxyl terminated polyester, polyether, or polycarbonate, preferably polyether, which is further reacted with a polyisocyanate, preferably a diisocyanate, along with extender glycol desirably in a so-called one-shot process or simultaneous co-reaction of polyester, polycarbonate or polyether intermediate, diisocyanate, and extender glycol to produce a high molecular weight linear TPU polymer. The preparation of the macroglycol is generally well known in the art and any suitable method may be used. The weight average (Mw) of the TPU polymer is generally about 80000 to 800000, and preferably from about 90000 to about 450000 Daltons. The equivalent weight amount of diisocyanate to the total equivalent weight amount of hydroxyl containing components, that is the hydroxyl terminated polyester, polyether, or polycarbonate, and chain extender glycol, is typically from about 0.95 to about 1.10, desirably from about 0.96 to about 1.02, and preferably from about 0.97 to about 1.005.

Suitable polyisocyanates used may be aliphatic, araliphatic and/or aromatic polyisocyanates, typically of the type R—(NCO)x with x being at least 2 and R being an aromatic, aliphatic or combined aromatic/aliphatic group. Examples of R are diphenylmethane, toluene, dicyclohexylmethane, hexamethylene, or groups providing a similar polyisocyanate. Non-limiting examples of suitable polyisocyanates are diphenylmethane diisocyanate (MDI)—type isocyanates in the form of its 2,4', 2,2' and 4,4' isomers and mixtures thereof (also referred to as pure MDI), the mixtures of diphenylmethane diisocyanates (MDI) and oligomers thereof (known in the art as "crude" or polymeric MDI), and reaction products of polyisocyanates (e.g. polyisocyanates as set out above), with components containing isocyanate-reactive hydrogen atoms forming polymeric polyisocyanates or so-called prepolymers. Other examples are tolylene diisocyanate (also known as toluene diisocyanate, and referred to as TDI), such as 2,4 TDI and 2,6 TDI in any suitable isomer mixture, hexamethylene diisocyanate (HMDI or HDI), isophorone diisocyanate (IPDI), butylene diisocyanate, trimethylhexamethylene diisocyanate, di(isocyanatocyclohexyl)methane, e.g. 4,4'-diisocyanatodicyclohexylmethane (H12MDI), isocyanatomethyl-1,8-octane diisocyanate and tetramethylxylene diisocyanate (TMXDI), 1,5-naphtalenediisocyanate (NDI), p-phenylenediisocyanate (PPDI), 1,4-cyclohexanediisocyanate (CDI), tolidine diisocyanate (TODI), any suitable mixture of these polyisocyanates, and any suitable mixture of one or more of these polyisocyanates with MDI-type polyisocyanates.

Preferred diisocyanates include aromatic diisocyanates such as 4,4'-methylenebis-(phenyl isocyanate) (MDI), m-xylylene diisocyanate (XDI), phenylene-1,4-diisocyanate, naphthalene-1,5-diisocyanate, diphenylmethane-3,3'-dimethoxy-4,4'-diisocyanate and toluene diisocyanate (TDI), as well as aliphatic diisocyanates such as isophorone diisocyanate (IPDI), 1,4-cyclohexyl diisocyanate (CHDI), decane-1,10-diisocyanate, and dicyclohexylmethane-4,4'-diisocyanate. The most preferred diisocyanate is 4,4-methylenebis(phenyl isocyanate), i.e. MDI.

In the one-shot polymerization process which generally can occur in situ, a simultaneous reaction can occur between three components, that is, the one or more intermediates, the one or more polyisocyanates, and the one or more chain extenders, with the reaction generally being initiated at temperatures of from about 100° C. to about 120° C. Inasmuch as the reaction is exothermic, the reaction temperature generally increases to about 220° C.-250° C. In one exemplary embodiment, the TPU polymer may be pelletized following the reaction.

The flame retardant composition according to the invention may be incorporated with TPU polymer pellets to form the thermoplastic formulation of the present invention in a subsequent process.

The thermoplastic formulation can also comprises non-fire-retardant mineral fillers such as certain oxides, carbonates, silicates, borates, stannates, mixed oxide hydroxides, oxide hydroxide carbonates, hydroxide silicates, or hydroxide borates, or a mixture of these substances. By way of example, use may be made of calcium oxide, aluminum oxide, manganese oxide, tin oxide, boehmite, dihydrotalcite, hydrocalumite, or calcium carbonate. Preferred compounds are silicates and hydroxide silicates. These fillers are usually added in amounts of between 1 to 20% by weight based on the thermoplastic formulation, preferably between 1 and 10% by weight.

Other additives apart from the fillers may be used in the thermoplastic formulation of this invention. Additives such as catalysts, stabilizers, lubricants, colorants, antioxidants, antiozonates, light stabilizers, UV stabilizers and the like may be used in amounts of from 0 to 5 wt % of the thermoplastic composition, preferably from 0 to 2 wt %.

The thermoplastic polyurethane polymer, flame retardant composition and other optional additives may be compounded together by any means known to those skilled in the art. If a pelletized TPU polymer is used, the polymer may be melted at a temperature of about 150° C. to 215° C., preferably from about 160 to 190° C., and more preferably from about 170 to 180° C. The particular temperature used will depend on the particular TPU polymer used, as is well understood by those skilled in the art. The TPU polymer and the flame retardant composition are blended to form an intimate physical mixture. Blending can occur in any commonly used mixing device able to provide shear mixing, but a twin screw extruder having multiple heat zones with multiple feeding ports is preferably used for the blending and melting process i.e. compounding.

The TPU polymer, flame retardant composition and other optional additives may be pre-blended before adding to the compounding extruder or they may be added or metered into the compounding extruder in different streams and in different zones of the extruder.

In an alternate embodiment, the TPU polymer is not pelletized prior to the addition of the flame retardant composition of the invention. Rather, the process for forming the flame retardant thermoplastic polyurethane formulation of the present invention is a continuous in situ process. The ingredients to form the thermoplastic polyurethane polymer are added to a reaction vessel, such as a twin screw extruder as set forth above. During or after formation of the thermoplastic polyurethane polymer, the flame retardant composition of the present invention and optionally other additives may be added or metered into the extruder in different streams and/or in different zones of the extruder in order to form the thermoplastic polyurethane formulation.

The resultant formulation may exit the extruder die in a molten state and be pelletized and stored for further use in making finished articles. The finished articles may comprise injection-molded parts. Other finished articles may comprise extruded profiles and sheets.

In yet an alternate embodiment, the flame retardant composition of the invention or one or more of its components is/are added partially during the formation of the thermoplastic polyurethane polymer and partially during a subsequent compounding step.

The thermoplastic formulation of the present invention may be utilized in any application where high flame retardant performance is desired. In particular it can be utilized as conductor insulator or as a cable jacket as set forth in further detail below.

The disclosed formulation, because of their flame retardant properties, abrasion resistance and good tensile strength, are particularly suited for use as thermal and/or electric insulator for electrical conductors.

As used herein that the term "insulated" and "non-conductive" means electrically insulating and electrically non-conductive. As used herein the term "electrically non-conductive" is synonymous of "electrically insulating" and these terms may be used interchangeably. As used herein the term "electrically insulating" or "electrically non-conductive" material is a material that resists the flow of electric charge, also called a dielectric, as is well known to the skilled person.

The disclosed formulation, because of their flame retardant properties, abrasion resistance and good tensile strength, are also particularly suited for use as jacketing for electrical conductors in wire and cable construction applications, such as jacketing for armored cable, industrial robotic equipment, non-metallic sheath cable, deep well pump cables and other multiple conductor assemblies and consumer goods.

A typical wire and cable construction will have at least one and typically will have multiple electrical conductors, usually from 2 to 8 conductors, such as copper wires. Each conductor will typically be coated, normally by extrusion, with a thin layer of polymeric insulation compound which can be polyvinyl chloride, polyethylene, cross-linked polyethylene, fluorocarbon polymers, or the TPU formulation of the present invention. The multiple insulated conductors may be wrapped with metal, a fiberglass or other non-flammable textile. The multiple conductors can then be encased in a jacket material (i.e., the formulation of this invention) to protect the electrical conductors. It is necessary for this jacket material to be flame resistant in case a fire occurs.

The types of wire and cable constructions that are most suitable for using a jacket made from the formulations of the present invention are detailed in the UL-1581 standard. The UL-1581 standard contains specific details of the conductors, of the insulation, of the jackets and other coverings, and of the methods of sample preparation, of specimen selection and conditioning, and of measurement and calculation that are required in standards for Thermoset-Insulated Wires and Cable (UL-44), Thermoplastic-Insulated Wires and Cables (UL-83), Flexible Cord and Fixture Wire (UL-62) and Service-Entrance Cables (UL-854) and UL 758.

The formulation of the present invention not only passes all the fire retardancy tests mentioned above for wire and cable constructions but also all conventional tests for other flame-retardant applications such as UL94.

The fire performance of a wire and cable construction can be influenced by many factors, with the jacket being one factor. The flammability of the insulation material can also affect the fire performance of the wire and cable construction, as well as other inner components, such as paper wrappings, fillers, and the like.

Exemplary embodiments of wire and cable constructions are made by extruding the formulation according to the invention onto a bundle of insulated conductors to form a jacket around the insulated conductors. The thickness of the jacket depends on the requirements of the desired end use application. Typical thickness of the jacket is from about 0.25 mm to 5 mm and more typical from about 0.5 mm to about 1.5 mm.

The formulations may be shaped by extrusion to form the jacket. Usually, the formulation is in the form of pellets for easy feeding into the extruder. This method is the most common since the formulation is not normally made by the same party that makes the wire and cable construction. However, in accordance with an exemplary embodiment of the invention, the wire and cable jacket could be extruded directly from the compounding extruder without going through the separate step of pelletizing the formulation. This one-step compounding/extrusion process would eliminate one heat history step from the formulation.

The invention is illustrated but not limited by the following example.

EXAMPLE

In this example the following ingredients were used:
Magnesium oxide particles: 98% extra pure from Acros Organics D99<150
TPU: Irogran A 85P 4394, commercially available from Huntsman
APP: Ammonium polyphosphate FR CROS C 60 from Budenheim
Oligomeric phosphate ester: Resorcinol Bis-Diphenylphosphate (Fyrolflex RDP) from ICL-IP CAS #: 125997-21-9

A commercially available TPU (IROGRAN A 85P 4394) was intimately mixed using a compounder with flame retardants (comparative examples "comp"), or with a flame retardant composition according to embodiments of the invention, the type and amount of which is given in Table 1 below, molten and processed into a granulate. The granulates were placed into an extruder, and with this mixture a sheath having a wall thickness of 1 mm was extruded onto a multistranded cable core of 0.78 mm diameter.

Ten cables of the same composition and design thus produced were subjected to the UL VW-1 Vertical-Wire Flame Test (UL 1581). This is a small-scale test conducted on a single 24-inch length of wire. The flame source is a Tirrill burner (similar to a Bunsen burner) with a heat output of approximately 3000 BTU/hour. The flame is applied for 15 seconds and is then reapplied 4 more times. The period between applications is 15 seconds where the specimen ceases to burn within 15 seconds or the duration of the specimen flaming where this persists longer than 15 seconds. If the sample burns longer than 60 seconds after any application, or if the indicator flag or cotton batting is ignited during the test or if the indicator flag is ignited or scorched more than 25%, the cable fails the test.

The results are given in Table 1. These results show that when a fire retardant composition according to embodiment of the invention is used, improvements in afterburn, dripping and/or flag are observed.

TABLE 1

| Example | Amounts in TPU formulation | | | | | After burn | Dripping | Flag burning | Quantities in FRC | | |
|---|---|---|---|---|---|---|---|---|---|---|---|
| N° | % TPU | % APP | % Fyrolflex | % MgO | Total | sec | % pass | % pass | % APP | % Fyrolflex | % MgO |
| 1 (comp) | 100 | 0 | 0 | 0 | 100 | 65 | 0 | 0 | 0 | 0 | 0 |
| 2 (comp) | 90 | 10 | 0 | 0 | 100 | 43 | 0 | 0 | 100 | 0 | 0 |
| 3 (comp) | 80 | 20 | 0 | 0 | 100 | 53 | 0 | 0 | 100 | 0 | 0 |
| 4 (comp) | 70 | 30 | 0 | 0 | 100 | 45 | 0 | 0 | 100 | 0 | 0 |
| 5 (comp) | 60 | 40 | 0 | 0 | 100 | 45 | 0 | 0 | 100 | 0 | 0 |
| 6 (comp) | 81 | 0 | 19 | 0 | 100 | 15 | 0 | 100 | 0 | 100 | 0 |
| 7 (comp) | 85 | 10 | 5 | 0 | 100 | 30 | 0 | 100 | 67 | 33 | 0 |
| 8 (comp) | 60 | 20 | 20 | 0 | 100 | 7 | 100 | 0 | 50 | 50 | 0 |
| 9 (comp) | 60 | 30 | 10 | 0 | 100 | 1 | 0 | 100 | 75 | 25 | 0 |
| 10 (comp) | 45 | 40 | 15 | 0 | 100 | 5 | 80 | 100 | 73 | 27 | 0 |
| 11 (comp) | 89 | 10 | 0 | 1 | 100 | 63 | 0 | 0 | 91 | 0 | 9 |
| 12 (comp) | 79 | 20 | 0 | 1 | 100 | 25 | 0 | 0 | 95 | 0 | 5 |
| 13 (comp) | 69 | 30 | 0 | 1 | 100 | 42 | 0 | 0 | 97 | 0 | 3 |
| 14 (comp) | 59 | 40 | 0 | 1 | 100 | 43 | 0 | 0 | 98 | 0 | 2 |
| 15 (comp) | 87.5 | 10 | 0 | 2.5 | 100 | 67 | 100 | 0 | 80 | 0 | 20 |
| 16 (comp) | 77.5 | 20 | 0 | 2.5 | 100 | 31 | 100 | 0 | 89 | 0 | 11 |
| 17 (comp) | 67.5 | 30 | 0 | 2.5 | 100 | 34 | 100 | 0 | 92 | 0 | 8 |
| 18 (comp) | 57.5 | 40 | 0 | 2.5 | 100 | 37 | 100 | 0 | 94 | 0 | 6 |
| 19 (comp) | 85 | 10 | 0 | 5 | 100 | 27 | 100 | 0 | 67 | 0 | 33 |
| 20 (comp) | 75 | 20 | 0 | 5 | 100 | 31 | 100 | 0 | 80 | 0 | 20 |
| 21 (comp) | 65 | 30 | 0 | 5 | 100 | 32 | 100 | 0 | 86 | 0 | 14 |
| 22 (comp) | 55 | 40 | 0 | 5 | 100 | 31 | 100 | 0 | 89 | 0 | 11 |
| 23 (comp) | 81 | 0 | 19 | 0 | 100 | 15 | 0 | 100 | 0 | 100 | 0 |
| 24 (comp) | 80 | 0 | 19 | 1 | 100 | 25 | 40 | 80 | 0 | 95 | 0 |
| 25 (comp) | 79 | 0 | 19 | 2 | 100 | 35 | 50 | 40 | 0 | 90 | 10 |
| 26 (comp) | 78 | 0 | 19 | 3 | 100 | 45 | 60 | 40 | 0 | 86 | 14 |
| 27 (comp) | 77 | 0 | 19 | 4 | 100 | 55 | 100 | 20 | 0 | 83 | 17 |
| 28 (comp) | 76 | 0 | 19 | 5 | 100 | 49 | 100 | 0 | 0 | 79 | 21 |
| 29 (comp) | 75 | 0 | 19 | 6 | 100 | 106 | 100 | 0 | 0 | 76 | 24 |
| 30 (comp) | 74 | 0 | 19 | 7 | 100 | 78 | 100 | 0 | 0 | 73 | 27 |
| 31 (comp) | 73 | 0 | 19 | 8 | 100 | 87 | 100 | 0 | 0 | 70 | 30 |
| 32 | 79 | 10 | 10 | 1 | 100 | 45 | 0 | 100 | 48 | 48 | 5 |
| 33 | 73 | 10 | 15 | 2 | 100 | 17 | 70 | 70 | 37 | 56 | 7 |
| 34 | 67 | 10 | 20 | 3 | 100 | 15 | 0 | 100 | 30 | 61 | 9 |
| 35 | 64 | 20 | 15 | 1 | 100 | 8 | 30 | 100 | 56 | 42 | 3 |
| 36 | 68 | 20 | 10 | 2 | 100 | 50 | 0 | 0 | 63 | 31 | 6 |
| 37 | 72 | 20 | 5 | 3 | 100 | 38 | 0 | 0 | 71 | 18 | 11 |
| 38 | 64 | 30 | 5 | 1 | 100 | 1 | 0 | 100 | 83 | 14 | 3 |
| 39 | 48 | 30 | 20 | 2 | 100 | 2 | 0 | 100 | 58 | 38 | 4 |
| 40 | 52 | 30 | 15 | 3 | 100 | 12 | 30 | 100 | 63 | 31 | 6 |

TABLE 1-continued

| Example N° | Amounts in TPU formulation | | | | | After burn sec | Dripping % pass | Flag burning % pass | Quantities in FRC | | |
|---|---|---|---|---|---|---|---|---|---|---|---|
| | % TPU | % APP | % Fyrolflex | % MgO | Total | | | | % APP | % Fyrolflex | % MgO |
| 41 | 39 | 40 | 20 | 1 | 100 | 7 | 50 | 100 | 66 | 33 | 2 |
| 42 | 53 | 40 | 5 | 2 | 100 | 13 | 60 | 100 | 85 | 11 | 4 |
| 43 | 47 | 40 | 10 | 3 | 100 | 8 | 60 | 100 | 75 | 19 | 6 |
| 44 (comp) | 80 | 10 | 10 | 0 | 100 | 30 | 0 | 100 | 50 | 50 | 0 |
| 45 | 79 | 10 | 10 | 1 | 100 | 45 | 0 | 100 | 48 | 48 | 5 |
| 46 | 78 | 10 | 10 | 2 | 100 | 48 | 40 | 0 | 45 | 45 | 9 |
| 47 | 77 | 10 | 10 | 3 | 100 | 51 | 100 | 0 | 43 | 43 | 13 |
| 48 (comp) | 77.5 | 10 | 12.5 | 0 | 100 | 28 | 0 | 100 | 44 | 56 | 0 |
| 49 | 76.5 | 10 | 12.5 | 1 | 100 | 33 | 0 | 70 | 43 | 53 | 4 |
| 50 | 75.5 | 10 | 12.5 | 2 | 100 | 44 | 0 | 30 | 41 | 51 | 8 |
| 51 | 74.5 | 10 | 12.5 | 3 | 100 | 34 | 100 | 0 | 39 | 49 | 12 |
| 52 (comp) | 75 | 10 | 15 | 0 | 100 | 25 | 0 | 100 | 40 | 60 | 0 |
| 53 | 74 | 10 | 15 | 1 | 100 | 20 | 50 | 100 | 38 | 58 | 4 |
| 54 | 73 | 10 | 15 | 2 | 100 | 17 | 70 | 70 | 37 | 56 | 7 |
| 55 | 72 | 10 | 15 | 3 | 100 | 25 | 100 | 70 | 36 | 54 | 11 |
| 56 (comp) | 72.5 | 10 | 17.5 | 0 | 100 | 24 | 0 | 100 | 36 | 64 | 0 |
| 57 | 71.5 | 10 | 17.5 | 1 | 100 | 30 | 100 | 0 | 35 | 61 | 4 |
| 58 | 70.5 | 10 | 17.5 | 2 | 100 | 59 | 50 | 50 | 34 | 59 | 7 |
| 59 | 69.5 | 10 | 17.5 | 3 | 100 | 95 | 100 | 0 | 33 | 57 | 10 |
| 60 | 68.5 | 10 | 17.5 | 4 | 100 | 91 | 50 | 0 | 32 | 56 | 13 |
| 61 (comp) | 70 | 15 | 15 | 0 | 100 | 24 | 0 | 100 | 50 | 50 | 0 |
| 62 | 69 | 15 | 15 | 1 | 100 | 22 | 100 | 100 | 48 | 48 | 3 |
| 63 | 68 | 15 | 15 | 2 | 100 | 43 | 100 | 100 | 47 | 47 | 6 |
| 64 | 67 | 15 | 15 | 3 | 100 | 7 | 50 | 100 | 45 | 45 | 9 |
| 65 | 66 | 15 | 15 | 4 | 100 | 83 | 100 | 0 | 44 | 44 | 12 |
| 66 | 59 | 15 | 25 | 1 | 100 | 18 | 100 | 100 | 37 | 61 | 2 |
| 67 | 58 | 15 | 25 | 2 | 100 | 35 | 100 | 100 | 36 | 60 | 5 |
| 68 | 49 | 15 | 35 | 1 | 100 | 17 | 100 | 100 | 29 | 69 | 2 |
| 69 | 48 | 15 | 35 | 2 | 100 | 30 | 100 | 100 | 29 | 67 | 4 |
| 70 | 44 | 15 | 15 | 1 | 100 | 17 | 100 | 100 | 27 | 71 | 2 |
| 71 | 43 | 15 | 15 | 2 | 100 | 31 | 100 | 100 | 26 | 70 | 4 |
| 72 (comp) | 65 | 20 | 15 | 0 | 100 | 20 | 0 | 100 | 57 | 43 | 0 |
| 73 | 64 | 20 | 15 | 1 | 100 | 19 | 50 | 100 | 56 | 42 | 3 |
| 74 | 63 | 20 | 15 | 2 | 100 | 29 | 50 | 50 | 54 | 41 | 5 |
| 75 | 62 | 20 | 15 | 3 | 100 | 43 | 100 | 50 | 53 | 39 | 8 |
| 76 | 62 | 20 | 15 | 3 | 100 | 16 | 50 | 100 | 53 | 39 | 8 |
| 77 | 61 | 20 | 15 | 4 | 100 | 46 | 100 | 50 | 51 | 38 | 10 |
| 78 (comp) | 70 | 30 | 0 | 0 | 100 | 45 | 0 | 0 | 100 | 0 | 0 |
| 79 (comp) | 69 | 30 | 0 | 1 | 100 | 42 | 0 | 0 | 97 | 0 | 3 |
| 80 (comp) | 67.5 | 30 | 0 | 2.5 | 100 | 34 | 100 | 0 | 92 | 0 | 8 |
| 81 (comp) | 65 | 30 | 0 | 5 | 100 | 32 | 100 | 0 | 86 | 0 | 14 |
| 82 (comp) | 60 | 40 | 0 | 0 | 100 | 45 | 0 | 0 | 100 | 0 | 0 |
| 83 (comp) | 59 | 40 | 0 | 1 | 100 | 43 | 0 | 0 | 98 | 0 | 2 |
| 84 (comp) | 57.5 | 40 | 0 | 2.5 | 100 | 37 | 100 | 0 | 94 | 0 | 6 |
| 85 (comp) | 55 | 40 | 0 | 5 | 100 | 31 | 100 | 0 | 89 | 0 | 11 |
| 86 | 62.5 | 30 | 5 | 2.5 | 100 | 31 | 100 | 50 | 80 | 13 | 7 |
| 87 | 57.5 | 30 | 10 | 2.5 | 100 | 24 | 70 | 50 | 71 | 24 | 6 |
| 88 | 52.5 | 30 | 15 | 2.5 | 100 | 12 | 30 | 100 | 63 | 32 | 5 |
| 89 | 57.5 | 35 | 5 | 2.5 | 100 | 29 | 100 | 70 | 82 | 12 | 6 |
| 90 | 52.5 | 35 | 10 | 2.5 | 100 | 21 | 100 | 100 | 74 | 21 | 5 |
| 91 | 47.5 | 35 | 15 | 2.5 | 100 | 17 | 100 | 100 | 67 | 29 | 5 |
| 92 | 42.5 | 35 | 20 | 2.5 | 100 | 9 | 60 | 100 | 61 | 35 | 4 |
| 93 | 52.5 | 40 | 5 | 2.5 | 100 | 13 | 60 | 100 | 84 | 11 | 5 |
| 94 | 47.5 | 40 | 10 | 2.5 | 100 | 8 | 60 | 100 | 76 | 19 | 5 |
| 95 | 42.5 | 40 | 15 | 2.5 | 100 | 5 | 80 | 100 | 70 | 26 | 4 |

Abbreviation:
FRC—flame retardant composition.

The invention claimed is:

1. A formulation comprising at least one thermoplastic polyurethane polymer and a flame retardant composition, said flame retardant composition comprising
   i) at least one metal or metalloid oxide particle selected from magnesium oxide, silicon oxide, or aluminium oxide, wherein the at least one metal or metalloid oxide particle is present in the flame retardant composition in an amount ranging from 0.5% to 11% by weight based on 100% by weight of the flame retardant composition, and the at least one metal or metalloid oxide particle has a D99 of less than 300 μm measured by laser diffraction analysis;
   ii) at least one phosphate component selected from the group comprising ammonium polyphosphate (APP), melamine phosphate, melamine pyrophosphate and melamine polyphosphate or mixture thereof, and
   iii) at least one oligomeric phosphate ester.

2. The formulation according to claim 1, wherein the at least one metal or metalloid oxide particle selected from magnesium oxide, silicon oxide, or aluminium oxide.

3. The formulation according to claim 1, wherein the at least one metal or metalloid oxide particle is magnesium oxide.

4. The formulation according to claim 1, wherein said at least one oligomeric phosphate ester is resorcinol bis(diphenyl phosphate).

5. The formulation according to claim 1, wherein the at least one metal or metalloid oxide particle is present in the flame retardant composition in an amount ranging from 1% to 8% by weight based on 100% by weight of the flame retardant composition.

6. The formulation according to claim 1, wherein the flame retardant composition is present in the formulation in an amount ranging from 47% to 53% by weight based on 100% by weight of the formulation.

7. The formulation according to claim 1, wherein the phosphate component is present in the flame retardant composition in an amount ranging from 25% to 85% by weight based on 100% by weight of the flame retardant composition.

8. The formulation according to claim 1, wherein the oligomeric phosphate ester is present in the flame retardant composition in an amount ranging from 10% to 70% by weight based on 100% by weight of the flame retardant composition.

9. The formulation according to claim 1, wherein the at least one thermoplastic polyurethane polymer can be present in the formulation in an amount ranging from 35% to 75% by weight based on 100% by weight of the formulation.

10. The formulation according to claim 1, wherein the flame retardant composition is present in the formulation in an amount ranging from 25% to 65% by weight based on 100% by weight of the formulation.

11. An electrical conductor jacket comprising at least one thermoplastic polyurethane polymer and a flame retardant, said flame retardant comprising
   i) at least one metal or metalloid oxide particle selected from magnesium oxide, silicon oxide, or aluminium oxide, wherein the at least one metal or metalloid oxide particle is present in the flame retardant in an amount ranging from 0.5% to 11% by weight based on 100% by weight of the flame retardant composition, and the at least one metal or metalloid oxide particle has a D99 of less than 300 μm measured by laser diffraction analysis;
   ii) at least one phosphate component selected from the group comprising ammonium polyphosphate (APP), melamine phosphate, melamine pyrophosphate and melamine polyphosphate or mixture thereof, and
   iii) at least one oligomeric phosphate ester.

12. The electrical conductor jacket according to claim 11, wherein the at least one metal or metalloid oxide particle selected from magnesium oxide, silicon oxide, or aluminium oxide.

13. The electrical conductor jacket according to claim 11, wherein the at least one metal or metalloid oxide particle is magnesium oxide.

14. The electrical conductor jacket according to claim 11, wherein said at least one oligomeric phosphate ester is resorcinol bis(diphenyl phosphate).

15. The electrical conductor jacket according to claim 11, wherein the flame retardant composition is present in an amount ranging from 47% to 53% by weight, based on 100% by weight of the formulation.

16. The electrical conductor jacket according to claim 11, wherein the at least one metal or metalloid oxide particle is present in the flame retardant in an amount ranging from 1% to 8% by weight based on 100% by weight of the flame retardant composition.

17. The electrical conductor jacket according to claim 11, wherein the phosphate component is present in the flame retardant in an amount ranging from 25% to 85% by weight based on 100% by weight of the flame retardant composition.

18. The electrical conductor jacket according to claim 11, wherein the oligomeric phosphate ester is present in the flame retardant in an amount ranging from 10% to 70% by weight based on 100% by weight of the flame retardant composition.

19. The electrical conductor jacket according to claim 11, wherein the at least one thermoplastic polyurethane polymer can be present in an amount ranging from 35% to 75% by weight based on 100% by weight of the formulation.

20. The electrical conductor jacket according to claim 11, wherein the flame retardant composition is present in an amount ranging from 25% to 65% by weight based on 100% by weight of the formulation.

* * * * *